United States Patent Office 3,551,802
Patented Dec. 29, 1970

3,551,802
ELECTROLYTIC CONDUCTIVITY CELL EMPLOYING A TUBE AND A BARRIER MEMBER
Eugene R. Kuczynski, Glenside, Pa., assignor to Leeds & Northrup Company, Philadelphia, Pa., a corporation of Pennsylvania
Filed Feb. 8, 1968, Ser. No. 703,932
Int. Cl. G01r 27/22
U.S. Cl. 324—30      2 Claims

ABSTRACT OF THE DISCLOSURE

A conductivity cell for measuring the specific conductivity of fluids utilizing two fluid guide chambers, each containing an electrode with a barrier therebetween which may easily be pierced anywhere along its length to provide fluid passages between the chambers, thereby allowing a wide range of cell constants from a basic conductivity cell structure.

BACKGROUND OF THE INVENTION

This invention relates generally to improvements in electrolytic conductivity cells and more specifically to such cells used for measuring the specific conductivity of liquids by passing therethrough an electric current.

The specific conductivity of a fluid is a useful characteristic, since it tells an observer meaningful information of the composition of the fluid. It is well known to measure conductance in a fluid under investigation between two electrodes with a voltage applied, the specific conductance of the liquid being defined as the conductance in mhos. of a column of solution 1 cm. long and 1 square cm. in cross-sectional area. This is the measured conductance between two electrodes multiplied by the effective path length between the electrodes in cm. and divided by the effective cross-sectional area along this path length in cm.$^2$ in which the current is passing. It is also well known to use a conductivity cell with any one of many configurations to be inserted in a bath of the fluid under investigation or inserted in a piping system carrying such a fluid in order to fix the effective path length between the two electrodes and to fix the cross-sectional area along this path length between the electrodes. Such cells are commonly classified according to their "cell constant" which is defined as the effective path length in cm. divided by the effective current-carrying cross-sectional area in cm.$^2$ between the cell's electrodes. In a cell's use, therefore, the specific conductance of a fluid under investigation may be determined by multiplying the conductivity measured between the electrodes by the particular cell constant.

It is often desired to interchange cells of different cell constants in fluids of widely varying specific conductivities in order to keep all measurements of conductivity within a certain range fixed by the associated measuring instruments and optimum cell performance. Therefore, a primary object of this invention is to construct a conductivity cell with a basic structure that may be finished into a cell with a desired cell constant with simplicity and economy.

It is another object of this invention to design a conductivity cell that may easily have its cell constant altered during construction according to a desired pre-calculated quantity.

It is a further object of this invention to provide a rugged, low-cost conductivity cell in a form which is easy to manufacture.

SUMMARY OF THE INVENTION

These and other objects of the invention are accomplished by an improved conductivity cell which includes two chambers separated by a barrier for containing a fluid under investigation with an electrode in each chamber between which an electric current is passed through the fluid. The barrier between these two chambers is constructed with fluid passages therethrough at predetermined positions along its length according to the predetermined cell constant desired. In another aspect of the invention, a basic cell structure is provided which allows modifications to obtain any cell constant desired within a wide range of cell constants.

The present invention is particularly pointed out and distinctly claimed in the appended claims. However, in order to understand the invention and applications thereof in its preferred embodiments, the following description is presented which should be taken in conjunction with the drawings.

DESCRIPTION OF THE PREFERRED EMBODIMENTS

Figure 1:
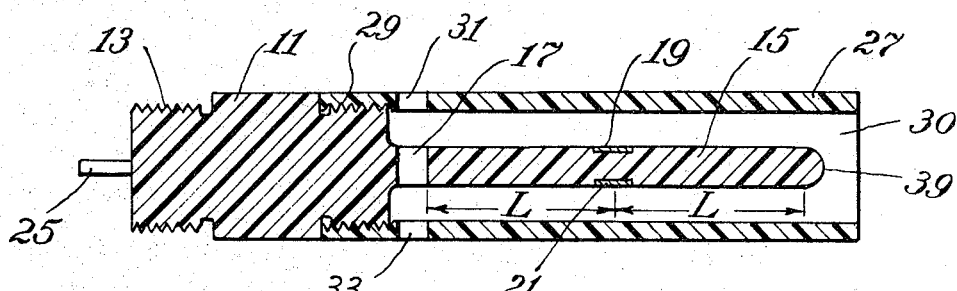
FIG. 1 is a cross-sectional view of a conductivity cell according to one embodiment of the present invention.
Figure 2:
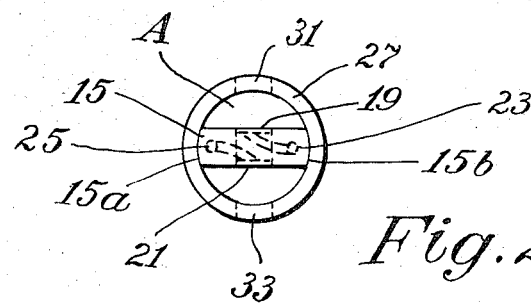
FIG. 2 is a view from the right-hand end of FIG. 1.

Referring to FIGS. 1 and 2, an electrically insulated cell body 11 has a threaded portion 13 for installation into a suitable supporting member, not shown. An electrically insulated barrier 15 of substantially rectangular cross-section rigidly attached to the cell body 11 serves to support electrodes 19 and 21. The cell body 11 and the attached barrier 15 are preferably molded as a single structure from an inert plastic material with conductors molded therein to connect electrode 19 with a connecting pin 23 and to connect electrode 21 to a pin 25.

An electrically insulated guard tube 27 attached to the cell body 11 by threads 29 serves to protect the electrodes 19 and 21 from physical damage and further serves to provide a container of known dimensions for the fluid in order that the specific conductivity may be determined. The electrodes 19 and 21 are located approximately at the center of the guard tube 27 along the length thereof. Fluid may enter a large opening 30 at the end of guard tube 27 and leave through openings 31 and 33. The transverse dimension of barrier member 15 preferably is made slightly larger than the inside diameter of the guard tube 27 so that there will be a fluid-tight seal between surfaces 15a, 15b of the barrier member 15 and the inner surface of guard tube 27 to prevent current traveling between the electrodes 19 and 21 by these paths. As a result of this improved configuration, only two separate pieces need be molded, the cell body 11 and the guard tube 27, for a wide variety of conductivity cells with different cell constants.

In the configuration of FIG. 1, it is apparent that there are two parallel conductance paths between the electrodes 19 and 21. One path is around an end 39 of the barrier member 15 and the other path is through a fluid passage 17 in the barrier member 15. It has been found that the cell constant for a given configuration may be approximated very accurately by dividing the path length L (effective path length) of FIG. 1 by the cross-sectional area A (effective cross-sectional area) of FIG. 2, if the thickness of the barrier member 15 is small in relation to the other parameters and if the fluid passage 17 has an area substantially that of the area A. This cell constant is then multiplied by the conductivity measured for a given fluid between electrodes 19 and 21 to get the specific conductivity of the fluid under investigation.

As a specific example, if a cell is constructed with a guard tube 27 having an inside diameter of 1.75 cm., a barrier member 15 with a thickness of 0.635 cm., and with the length L equal to 2.90 cm., the cell constant is calculated to be 5.0 cm.$^{-1}$.

Figure 3:
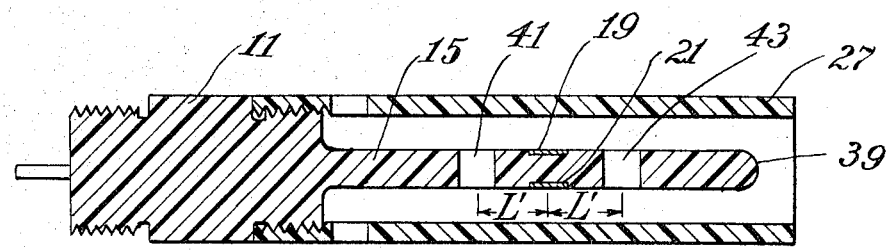
FIG. 3 is a cross-sectional view of a conductivity cell according to another embodiment of the present invention.

Referring to FIG. 3, another embodiment of the present invention is shown wherein two fluid passages 41 and 43 are provided in the barrier member 15 close to the electrodes 19 and 21 to provide a shorter effective path length for current traveling between the two electrodes than is provided in the configuration of FIG. 1. It has been discovered that the cell constant may be approximated very closely by dividing L' by the effective cross-sectional area of one of the passages 41 or 43. When L' is small in relation to the distance from the electrodes to the end 39 of the barrier member 15, the electrical path around the end 39 may be ignored because its conductivity is very small compared to the conductivity through the fluid passages 41 and 43.

It will be seen from these descriptions that the basic cell 11 including an attached barrier member 15 may be constructed with a cell constant selected from a wide range of cell constants since fluid passages may be easily installed along the barrier member 15 to provide conductivity paths with various effective cross-sectional areas and effective path lengths for many different types of applications. The manufacture of a cell of any constant over a wide range is exactly the same up to the point of installing fluid passages through the barrier member 15. This results in a great economy of production and flexibility in use of conductivity cells of the present invention since a cell constant may be calculated before installing fluid passages through the barrier member 15. A stock of identical manufactured cells without fluid passages may be maintained and each cell may be subsequently fabricated to the specifications of the eventual user. A further advantage of the configuration of this invention is that the electrodes 19 and 21 are firmly attached to a solid portion of the cell, resulting in a more rugged instrument.

Figure 4:
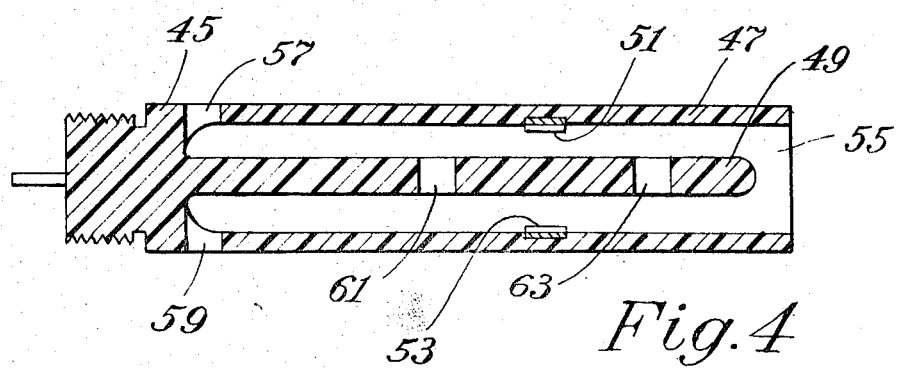
FIG. 4 is a cross-sectional view of a conductivity cell of unitary molded construction, according to another aspect of the present invention.

If a cell of a fixed constant is to be manufactured in its entirety at one time, a unitary molded cell such as shown in cross-section in FIG. 4 is an advantage. The cell body 45 includes an outer tube 47 with a barrier member 49 dividing the volume inside the tube 47 into two separate chambers. The electrodes 51 and 53 are shown here to be attached to the inside wall of the outer tube 47 but could also be mounted on the barrier member 49 as in FIGS. 1 and 3. An end 55 of tube 47 can be an inlet for the fluid into both chambers, and fluid passages 57 and 59 can serve as outlet passages for the fluid from each of the chambers. Fluid passages 61 and 63 connect the two chambers and determine the path length between the electrodes 51 and 53 and thus determine the cell constant. The advantage to this configuration is that it may be molded in one step and will be an entirely solid piece. As in the embodiments of the present invention hereinabove described, a wide variety of cell constants may be had by selectively locating the fluid passages 61 and 63 relative to the electrodes in adjustment of the effective path length and effective area through which the current flows between electrodes.

It shall be understood that the invention is not limited to the specific arrangements shown, and that changes and modifications may be made within the scope of the appended claims.

What is claimed is:

1. A conductivity cell for measuring the specific conductivity of a fluid, comprising:
   an elongated electrically insulated tube,
   an elongated barrier member cooperatively shaped with said tube to be removable therefrom, said barrier member having substantially the same length as said tube and with a cross-sectional area therealong that is substantially rectangular in shape with a constant distance between a pair of opposite flat surfaces, said barrier member having another pair of opposite surfaces shaped to extend along the length of said tube in contact with opposite inside surface areas of said tube in a liquid-tight manner, thereby to form a fluid chamber on either side of said barrier member between a flat surface thereof and an inside surface area of said tube, said barrier member additionally including at least one fluid passage therethrough, and
   a pair of electrodes attached to opposite sides of said barrier member on said flat surfaces thereof.

2. A conductivity cell according to claim 1 wherein said barrier member includes two fluid passages therethrough which allow fluid flow between said fluid chambers, one of said passages located on either side of said electrodes along the length of said barrier member.

References Cited

UNITED STATES PATENTS

| | | | |
|---|---|---|---|
| 2,122,363 | 6/1938 | Christie | 324—30 |
| 2,656,508 | 10/1953 | Coulter | 324—30B |
| 2,709,781 | 5/1955 | Douty et al. | 324—30 |
| 2,769,140 | 10/1956 | Obenshain | 324—30 |
| 2,888,640 | 5/1959 | Eckfeldt et al. | 324—30 |
| 3,028,546 | 4/1962 | Sproule | 324—30 |
| 3,054,047 | 9/1962 | Eckfeldt et al. | 324—30 |
| 3,361,965 | 1/1968 | Coulter et al. | 324—71PC |
| 3,060,375 | 10/1962 | Godshalk et al. | 324—30X |

E. E. KUBASIEWICZ, Primary Examiner